United States Patent [19]

Prokop et al.

[11] Patent Number: 5,170,340

[45] Date of Patent: Dec. 8, 1992

[54] SYSTEM STATE CONTROLLER FOR ELECTRONIC IMAGE PROCESSING SYSTEMS

[75] Inventors: Patricia A. Prokop, Webster; Irene M. Allen, Pittsford; Ernest L. Legg, Fairport; Anthony M. Federico, Webster; Donald S. Post, Rochester; Daniel Fleysher, Pittsford, all of N.Y.

[73] Assignee: Xerox Corporation, Stamford, Conn.

[21] Appl. No.: 591,325

[22] Filed: Sep. 28, 1990

[51] Int. Cl.[5] ............................................. G06F 15/46
[52] U.S. Cl. .................................. 364/143; 355/202; 395/650
[58] Field of Search ............... 364/148, 468, 401; 371/16.4, 16.5; 395/275, 325, 600, 650, 700; 355/200, 202

[56] References Cited

U.S. PATENT DOCUMENTS

| | | | |
|---|---|---|---|
| 3,838,260 | 9/1974 | Nelson | 235/153 AK |
| 4,475,156 | 10/1984 | Federico et al. | 395/700 |
| 4,514,846 | 4/1985 | Federico et al. | 371/16.5 |
| 4,532,584 | 7/1985 | Federico et al. | 364/140 |
| 4,691,317 | 9/1987 | Miazga et al. | 371/20 |
| 4,815,076 | 3/1989 | Denney et al. | 371/11 |
| 4,888,771 | 12/1989 | Benignus et al. | 371/16.1 |
| 4,922,491 | 5/1990 | Coale | 371/16.1 |
| 4,947,397 | 8/1990 | Sobel et al. | 371/16.4 |

*Primary Examiner*—Jerry Smith
*Assistant Examiner*—Paul Gordon
*Attorney, Agent, or Firm*—Frederick E. McMullen

[57] ABSTRACT

A state controller for an electronic reprographic system for controlling system operations when processing requests in which the system has a plurality of hardware and software system components providing discrete services for processing requests and maintaining operation of the system, and job programming means including a display screen for inputting requests, including: a state holder for monitoring the current operating state of the system components; plural discrete job processing virtual machines with each of the virtual machines having at least one service associated with it for implementing the virtual machine; each of the services having at least one of the system components for carrying out the service; and a scheduler for managing resources of and setting priorities for the virtual machines to process the requests in an efficient manner, the scheduler being adapted to cause memory from a first one of the virtual machines to be distributed to a second one of the virtual machines when the second one of the virtual machines requests more memory than is normally allocated to it.

9 Claims, 12 Drawing Sheets

FIG. 7

SYSTEM STATE CONTROLLER FOR ELECTRONIC IMAGE PROCESSING SYSTEMS

The invention relates to electronic image and PDL (page description language) processing systems, and more particularly, to a system state controller for efficiently controlling activities and resource usage within such systems.

In the past, copiers provided limited concurrent functions that were implemented by electro-mechanical components, the functions being primarily dedicated to one main task, i.e., copy a job and with one main user, i.e., the operator. The top level control software controlled the sequential operation, gathered fault and state information from the functional components below it, determined the overall state and active faults of the system, and used this information to present operator messages or inhibit certain features. With the advent of electronic reprographics systems, multiple users such as operator net clients, etc. are possible. Further, various configurations tailored to address specific markets and needs that provide unique sets of functions to the customer but built on a single common software package are possible.

In the prior art, U.S. Pat. No. 4,888,771 to Benignus et al discloses a diagnostic configuration management system for a data processing system used to decide which configuration of processor elements can be used based upon known faults. U.S. Pat. No. 3,838,260 to Nelson discloses a microprogrammable control memory diagnostic system wherein fault detection is performed concurrently with normal data processing, while U.S. Pat. No. 4,815,076 to Denney et al discloses a reconfiguration control which provides several different ways to recover from a single or multiple component fault. U.S. Pat. No. 4,691,317 to Miazga et al discloses a feature de-select control system enabling features on a xerographic copier to be de-selected while enabling the copier to continue to operate with other features. And U.S. Pat. No. 4,922,491 to Coale discloses an input/output service alert using a method of automatically analyzing exception states within computer peripheral subsystems.

In contrast, the present invention provides a state controller for an electronic reprographic system for controlling system operations when processing requests in which the system has a plurality of hardware and software components providing discrete services for processing requests and maintaining operation of the system, and job programming means including a display screen for inputting requests, the controller being independent of other parts of the system, comprising: a state holder for monitoring the current operating state of the system components; plural discrete job processing virtual machines with each of the virtual machines having at least one service associated with it for implementing the virtual machine; each of the services having at least one of the components for carrying out the service; and scheduling means for setting priorities for carrying out the transactions to process the requests in an efficient manner.

IN THE DRAWINGS

Figure 1:
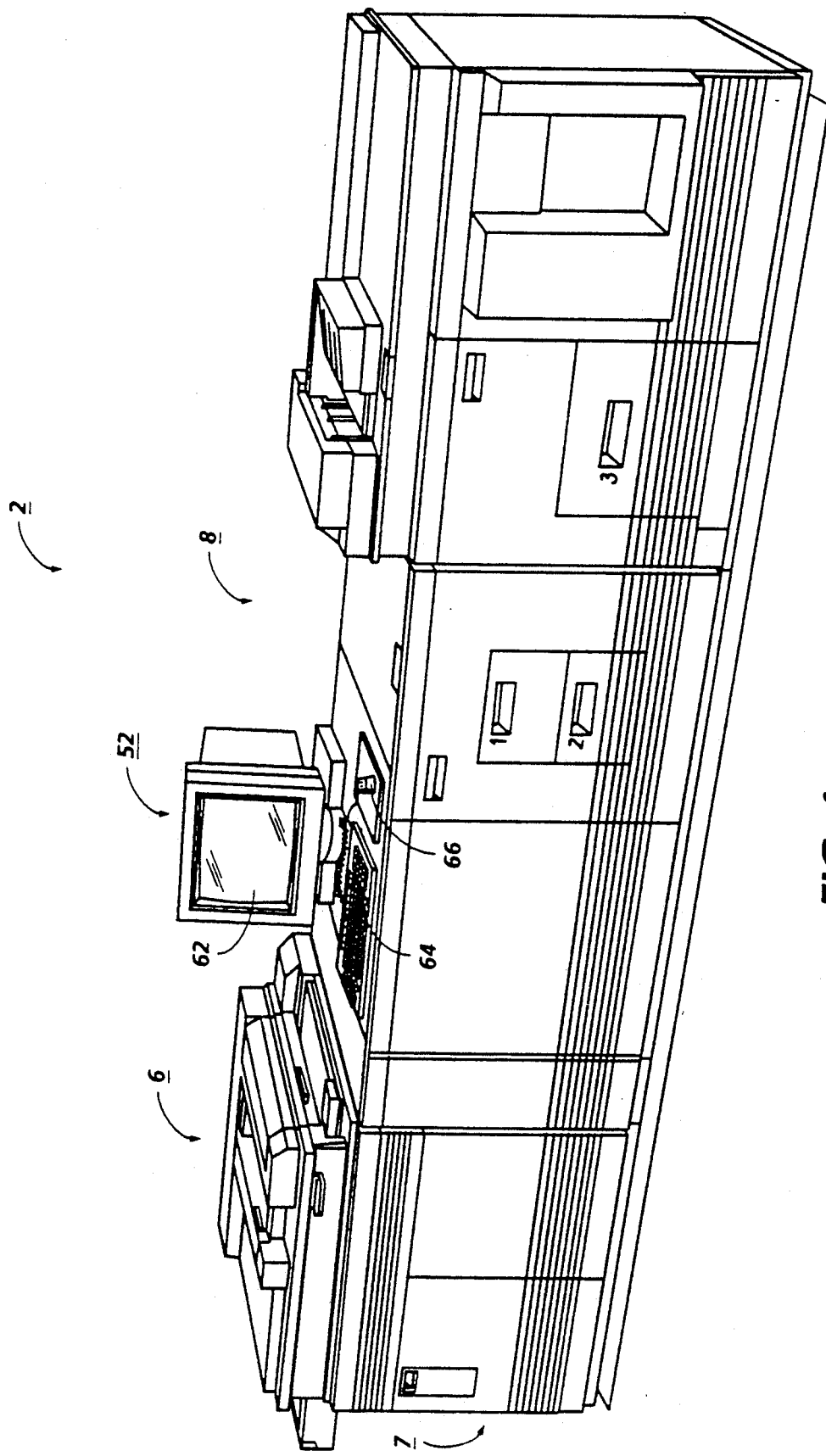
FIG. 1 is a view depicting an electronic system incorporating the System State Controller of the present invention.
Figure 5A:
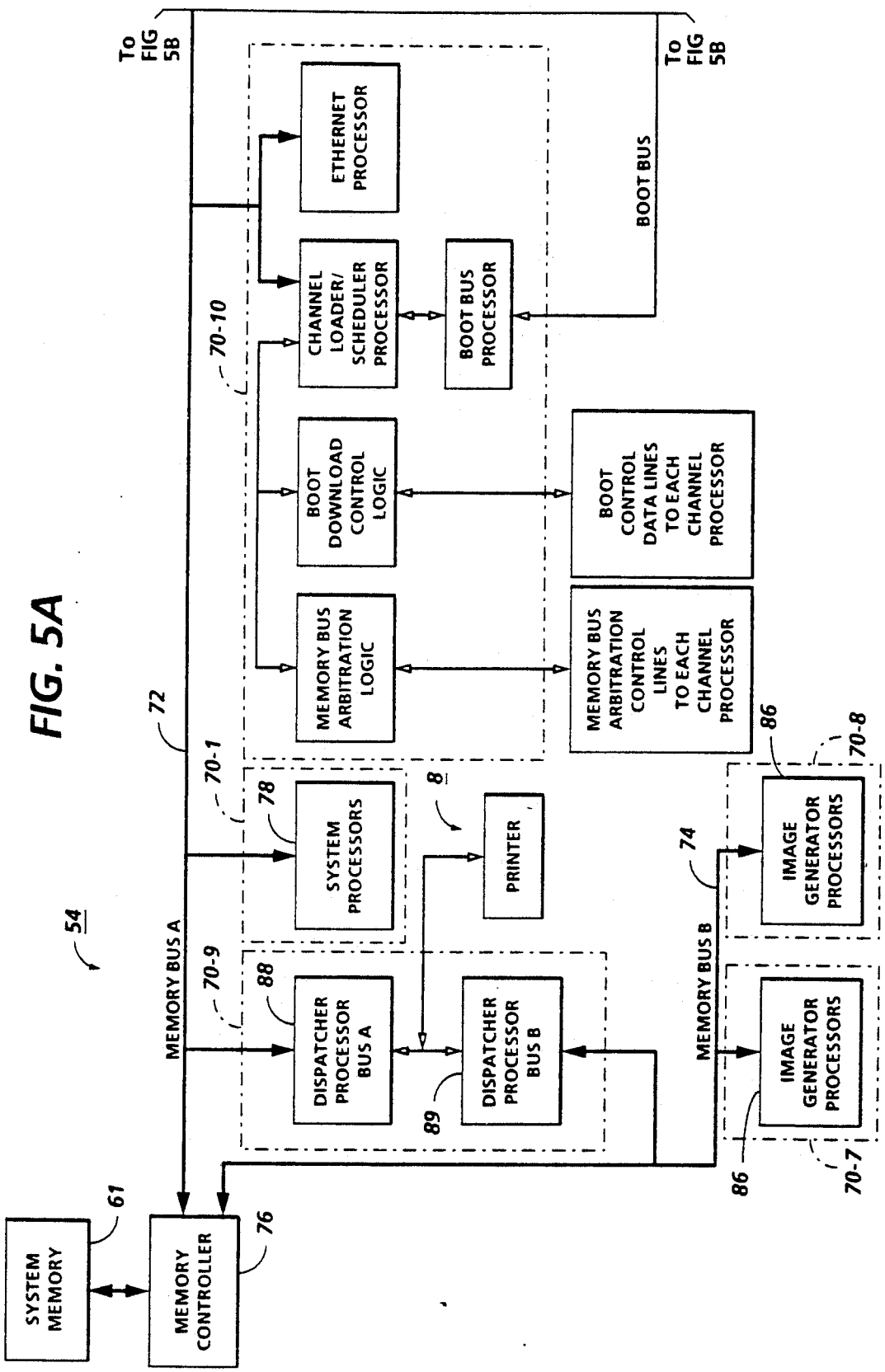
Figure 5B:
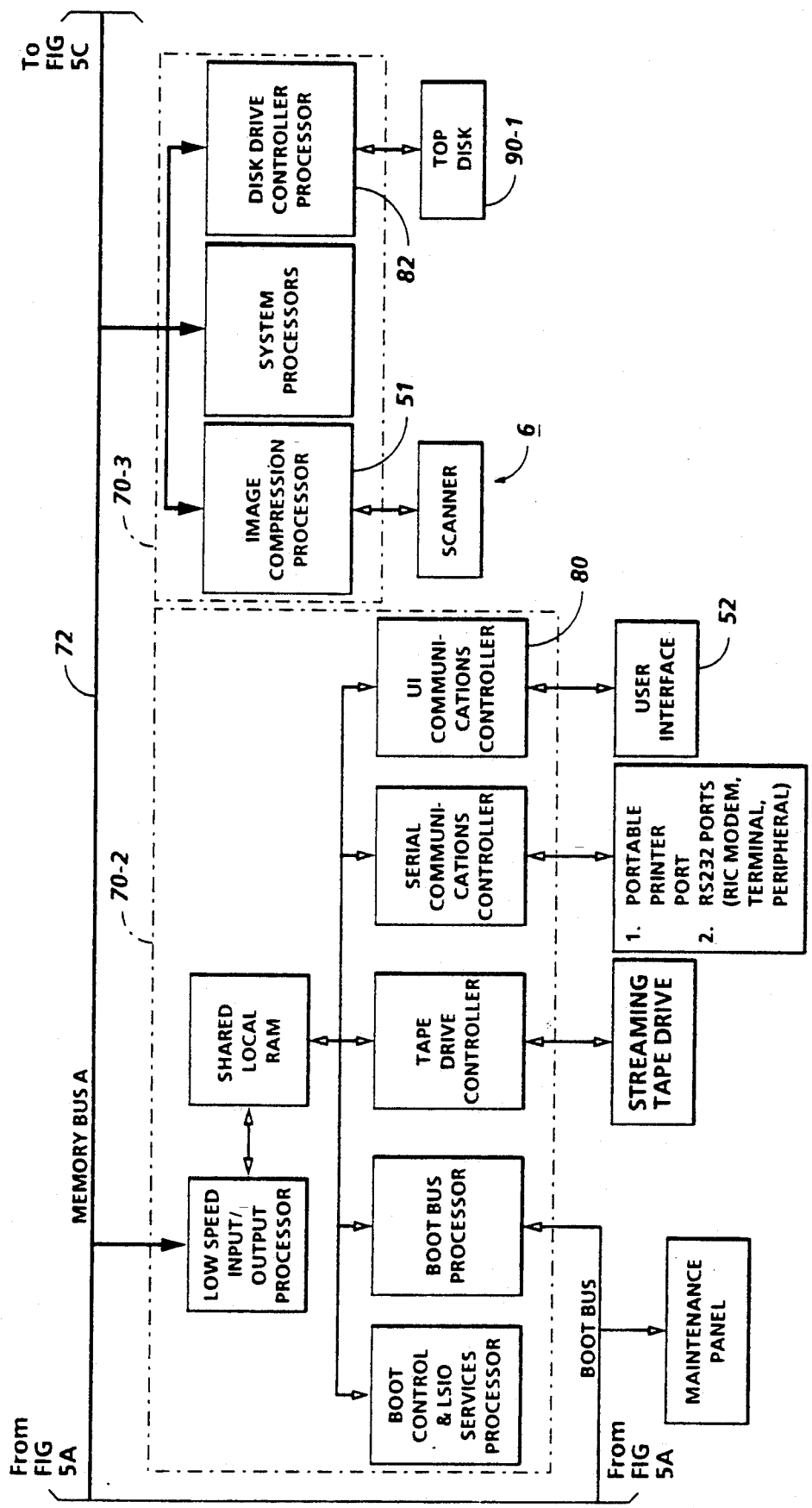
Figure 5C:
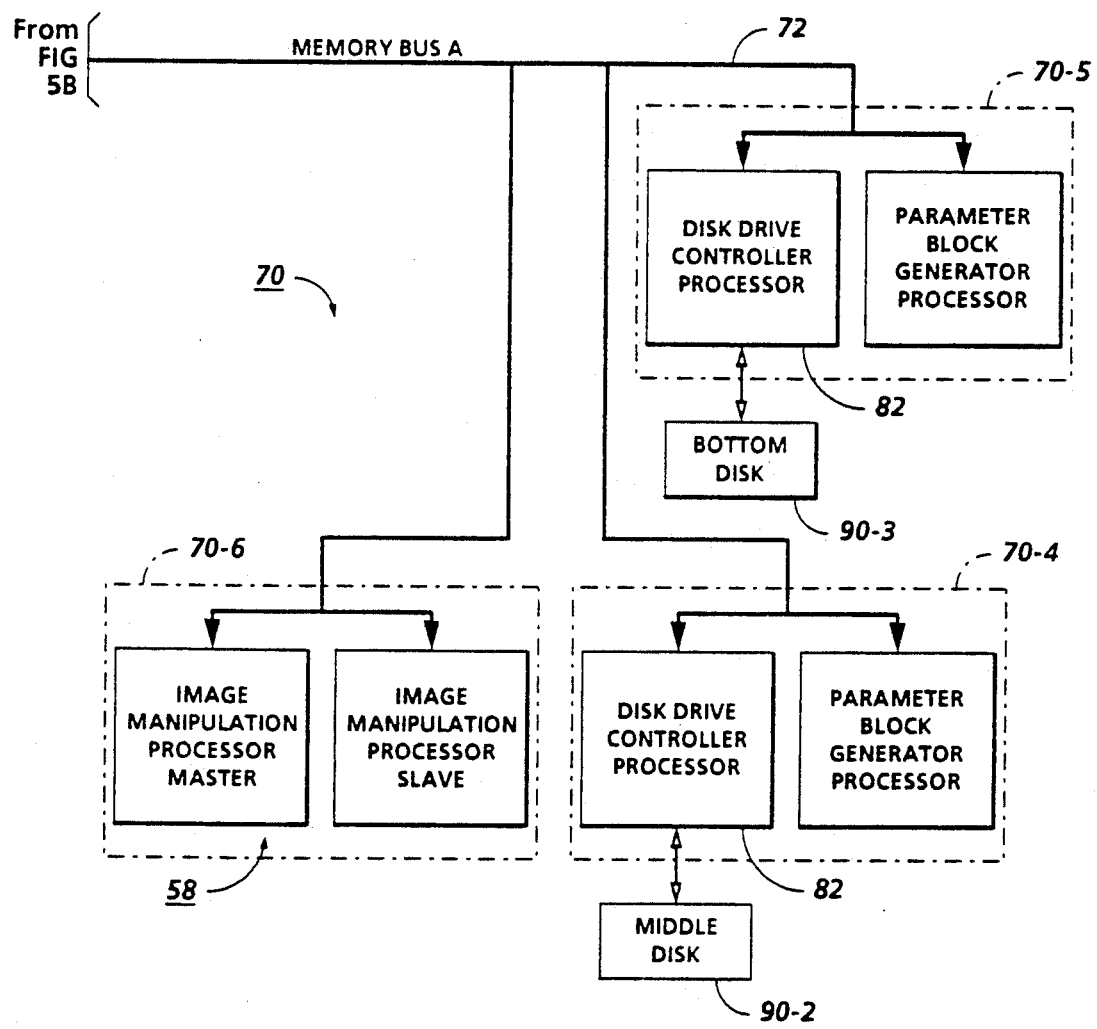
Figure 6:
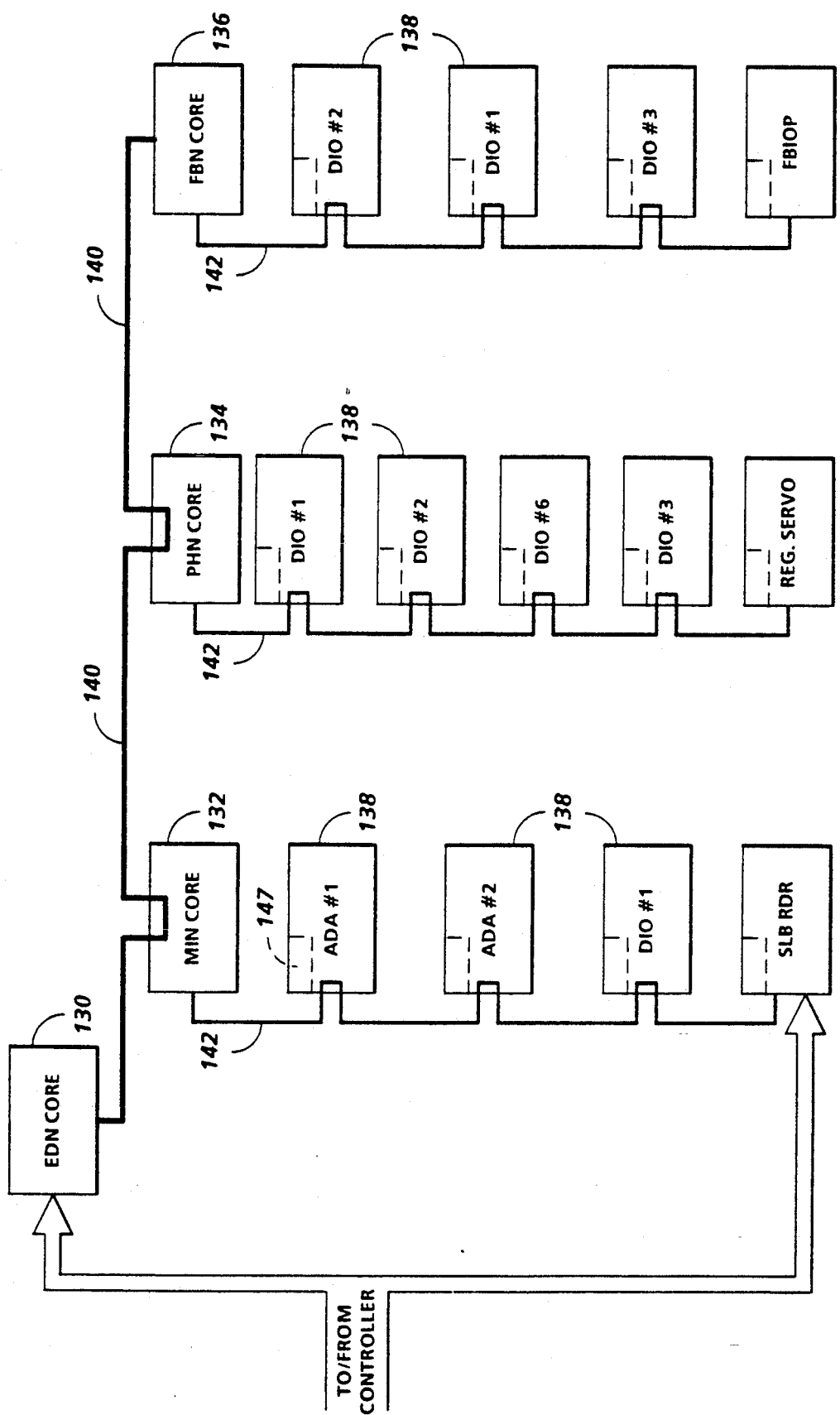
Figure 8:
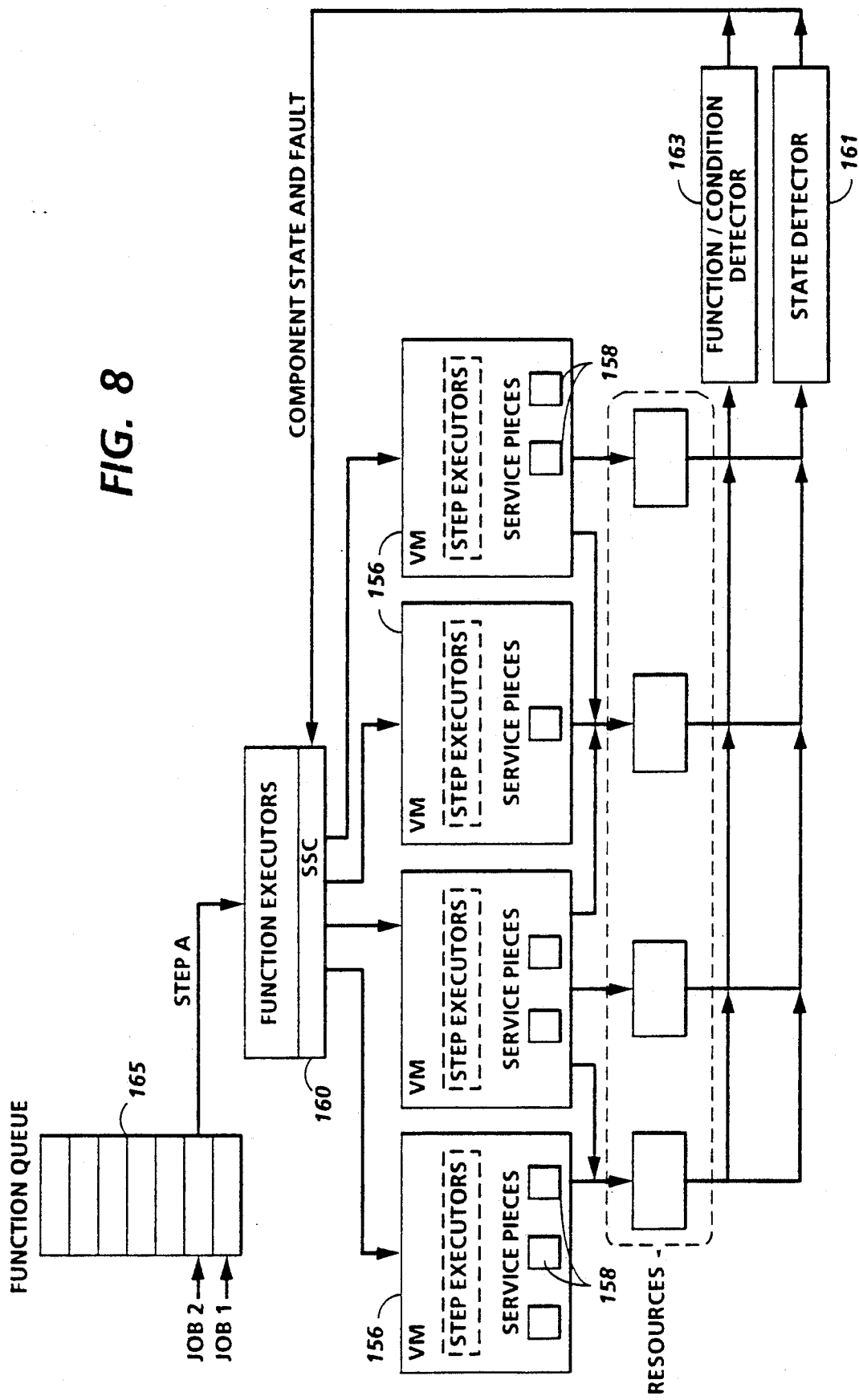
Figure 9:
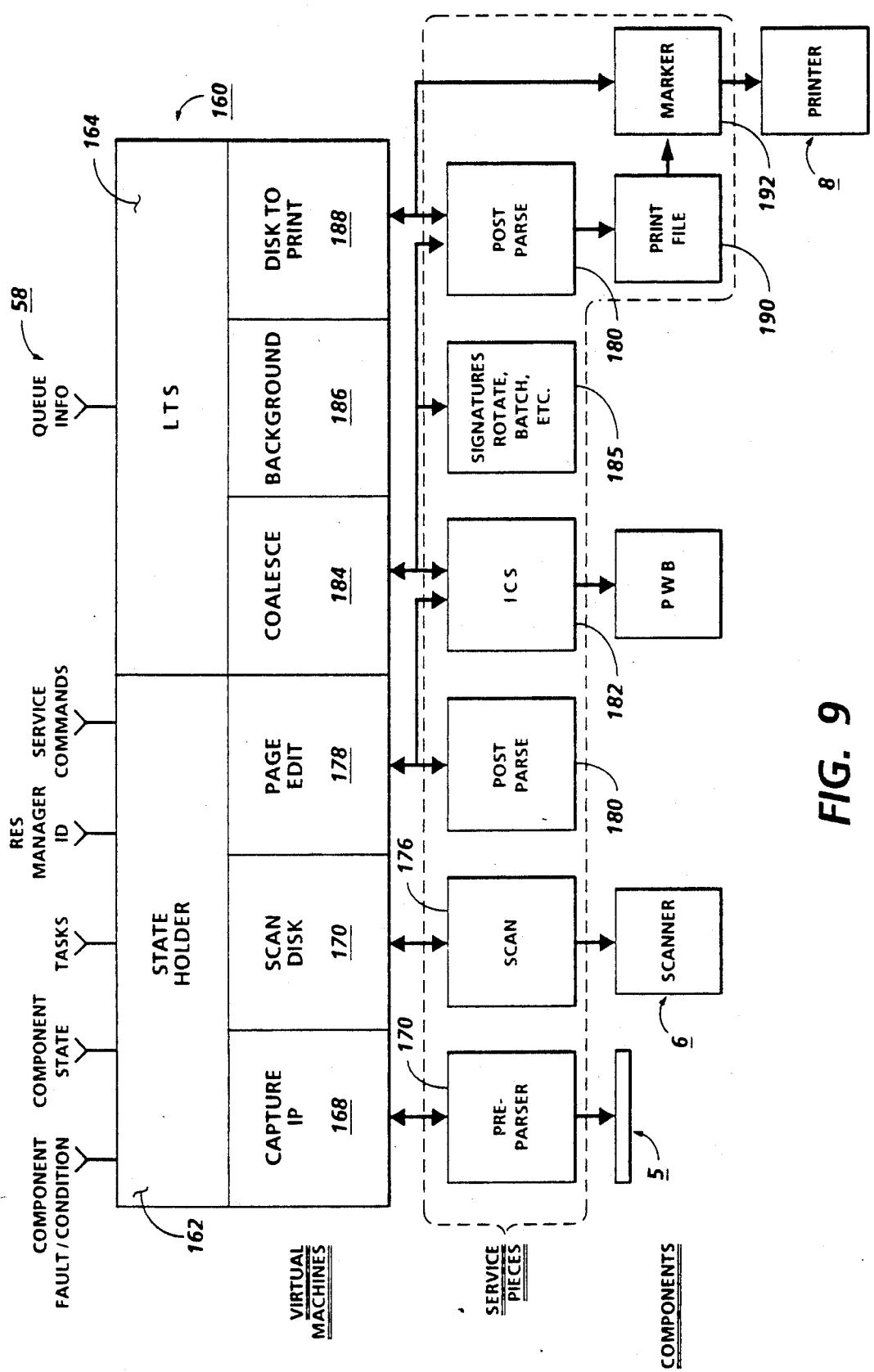
Figure 10:
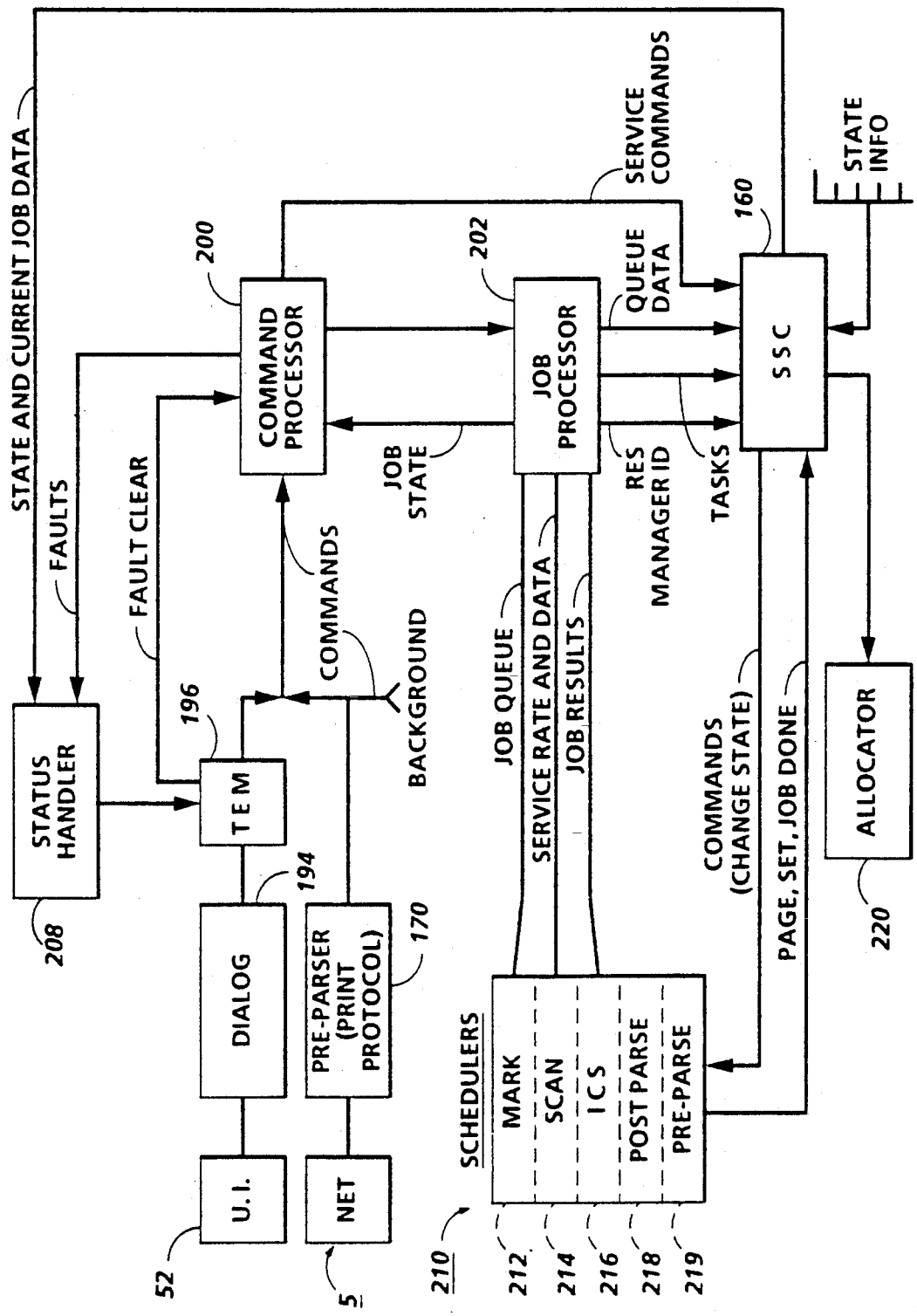

FIGS. 5A, 5B, and 5C comprise a schematic block diagram showing the major parts of the control section for the system shown in FIG. 1;

FIG. 6 is a block diagram of the Operating System, together with Printed Wiring Boards and shared line connections for the system shown in FIG. 1;

Figure 7:
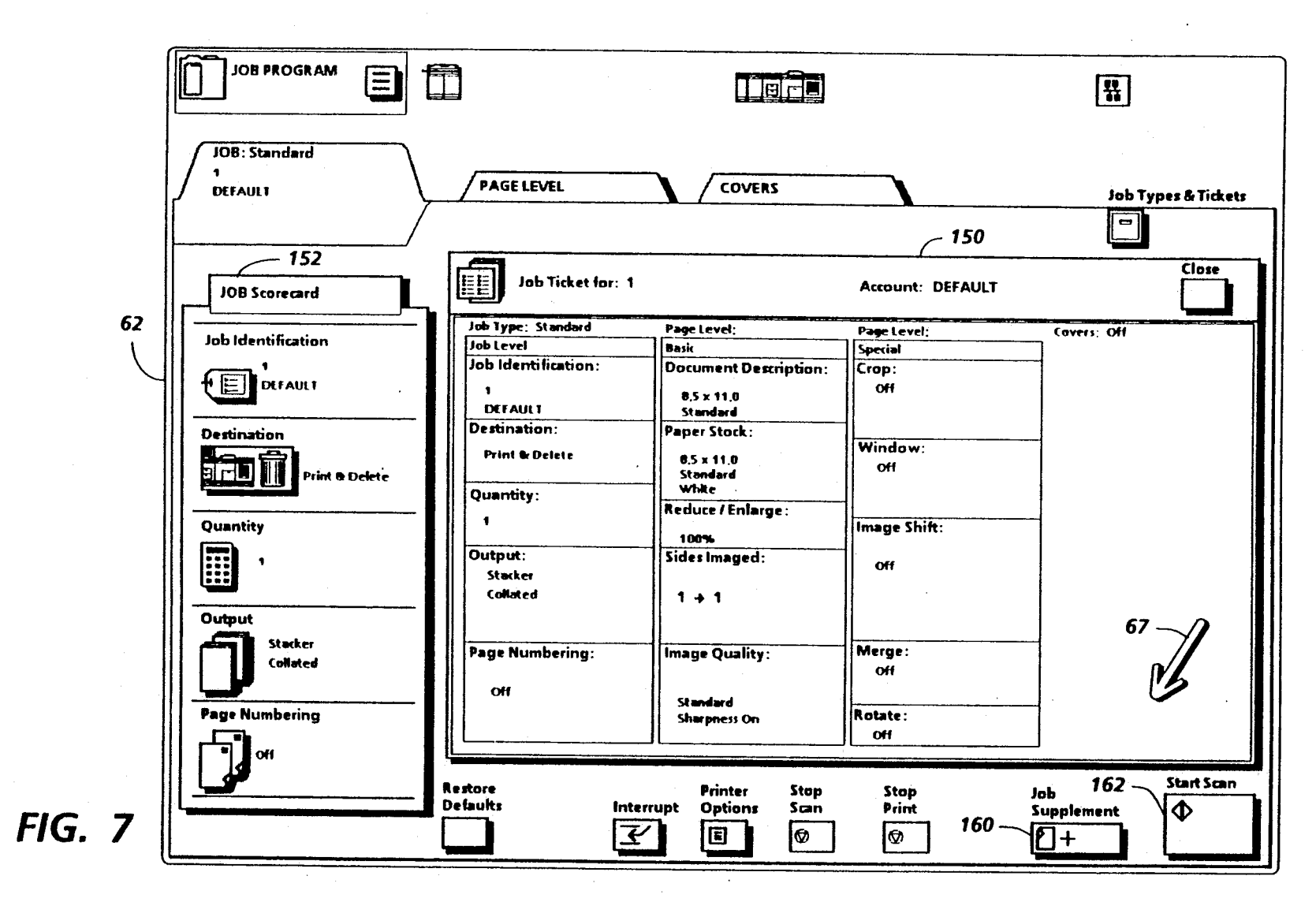

FIG. 7 is a view depicting an exemplary job programming ticket and job scorecard displayed on the User Interface (UI) touchscreen of the system shown in FIG. 1;

FIG. 8 is a schematic block diagram depicting the System State Controller of the present invention with Virtual Machine examples;

FIG. 9 is a schematic block diagram showing details of the System State Controller including virtual machines and service examples; and FIG. 10 is a schematic block diagram showing the relation between the System State Controller and other system components.

As used herein, a "Request" is any set of instructions or commands input by an operator, arriving via the network, or generated internally by the system. A Request is issued to:

- initiate new processing on a job (e.g. scan & print the job, edit the stored job, etc.)
- generally control the system's operation (e.g. stop the printer & any related print processing, shut down all current processing in preparation for power off or switch to diagnostic mode, etc.)
- control previously initiated job processing (e.g. abort the job, suspend the job, resume a previously suspended job, etc.)

Each Request which initiates new job processing is asking system 2 to perform some function which is divided into a series of "Virtual Machines" 156 (shown in FIG. 8). A virtual machine is logically a single operation on a job while a set of virtual machines is a plurality of discretely controlled operations for processing jobs. In actual implementation, each Virtual Machine 156 requires various system "Services" or Service Pieces 158 to carry out its operation. Each Service Piece 158 provides a specific low level system function. The same Service Piece may be used by multiple transactions as part of a higher level logical operation. In providing its specific function, each Service Piece uses basic system "Components" or physical resources such as hardware modules, software modules, or system resources (memory, disk, etc). The same Components may be used by multiple Service Pieces.

Individual Virtual Machines are identified by a "TransactionId". Individual Service Pieces are identified by a "ServiceId". When a particular Service Piece 158 is working on behalf of a specific Virtual Machine 156, it identifies itself by a "ResManager ID" which consists of a TransactionId, ServiceId pair. Resource (Res) Manager defines resource mapping that provides resources to clients on demand.

Figure 2:
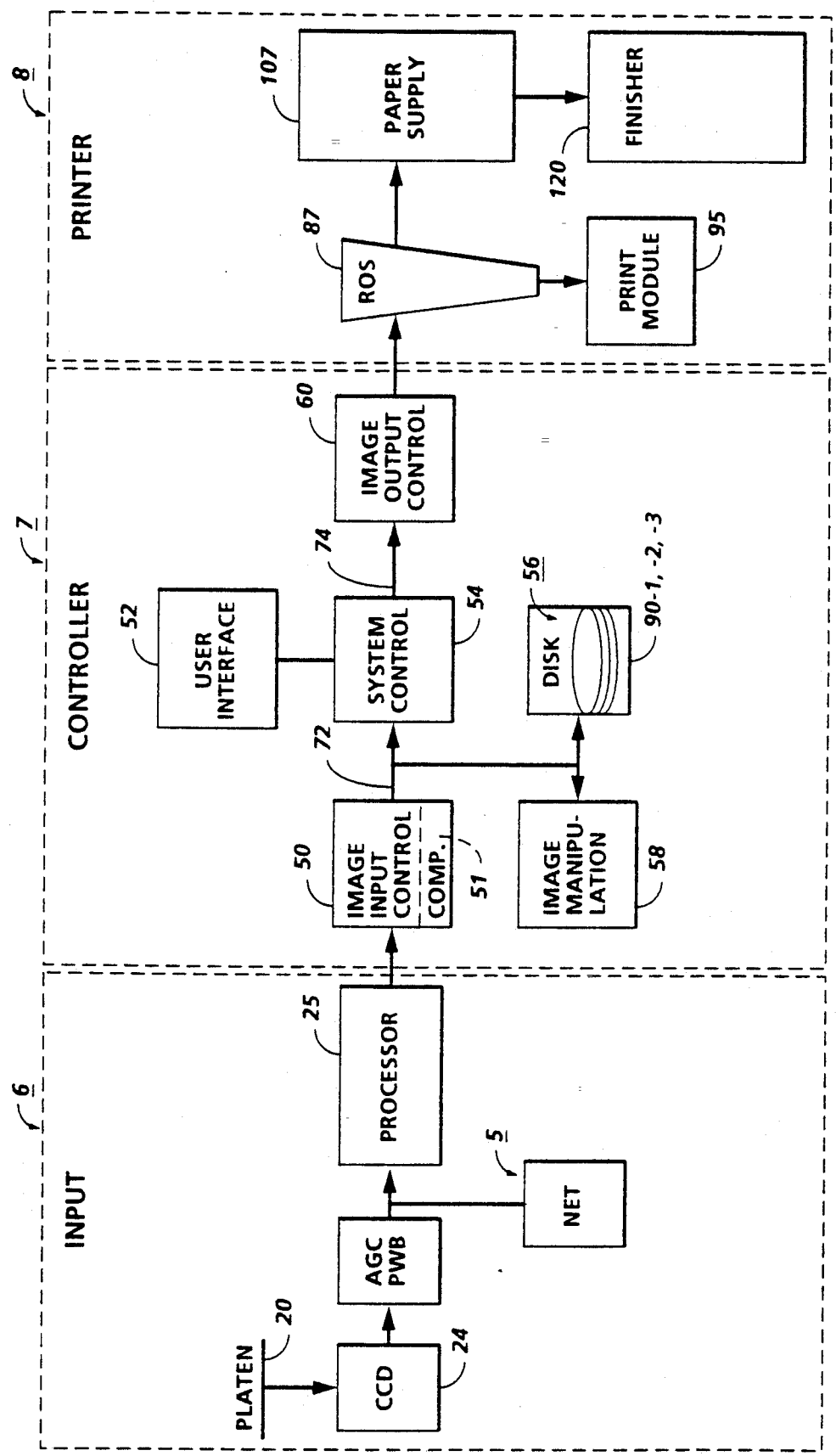
FIG. 2 is a block diagram depicting the major elements of the system shown in FIG. 1.

Referring to FIGS. 1 and 2, there is shown an exemplary system 2 supporting the processing of Requests in accordance with the teachings of the present invention. As will appear, system 2 has a plurality of independent functions (such as scan, print, etc.) which operate asynchronously, with operation being implemented by a shared set of Service Pieces and components. The exemplary system 2 shown for purposes of explanation provides network, scan, make ready, and print functions with both remote and on-site inputs in the form of network 5 and scanner 6, controller 7, and printer 8. Inputs to scanner are images, whereas inputs from network 5 are PDL (page description language) formats such as Interpress, Postscript, or HP PCL. To enable system 2 to be tailored to the specific needs of different customers and provide different functions to different customers, other configurations may be envisioned such as a stand alone printing system composed of scanner, controller, and printer 6, 7, 8 respectively, a network printer composed of network 5, controller 7, and printer 8 respectively, etc.

In system 2, components such as memory are shared by different Service Pieces running concurrently on behalf of various Virtual Machines which have been initiated in order to meet the current set of new job processing Requests. As a result, it is necessary, when these components become scarce or unavailable as, for example, due to a fault, overload, etc. to re-prioritize the Virtual Machines. This may lead to shutdown of one or more Virtual Machines even though all the Service Pieces needed by that Virtual Machine are ready and able to perform. These same Service Pieces will continue to be available for Virtual Machines other than the Virtual Machine or Machines shut down.

In order to provide a balance between the Virtual Machines, allow interaction in a controlled and efficient manner and provide prioritization of response to Requests, the present invention is provided.

Figure 3:
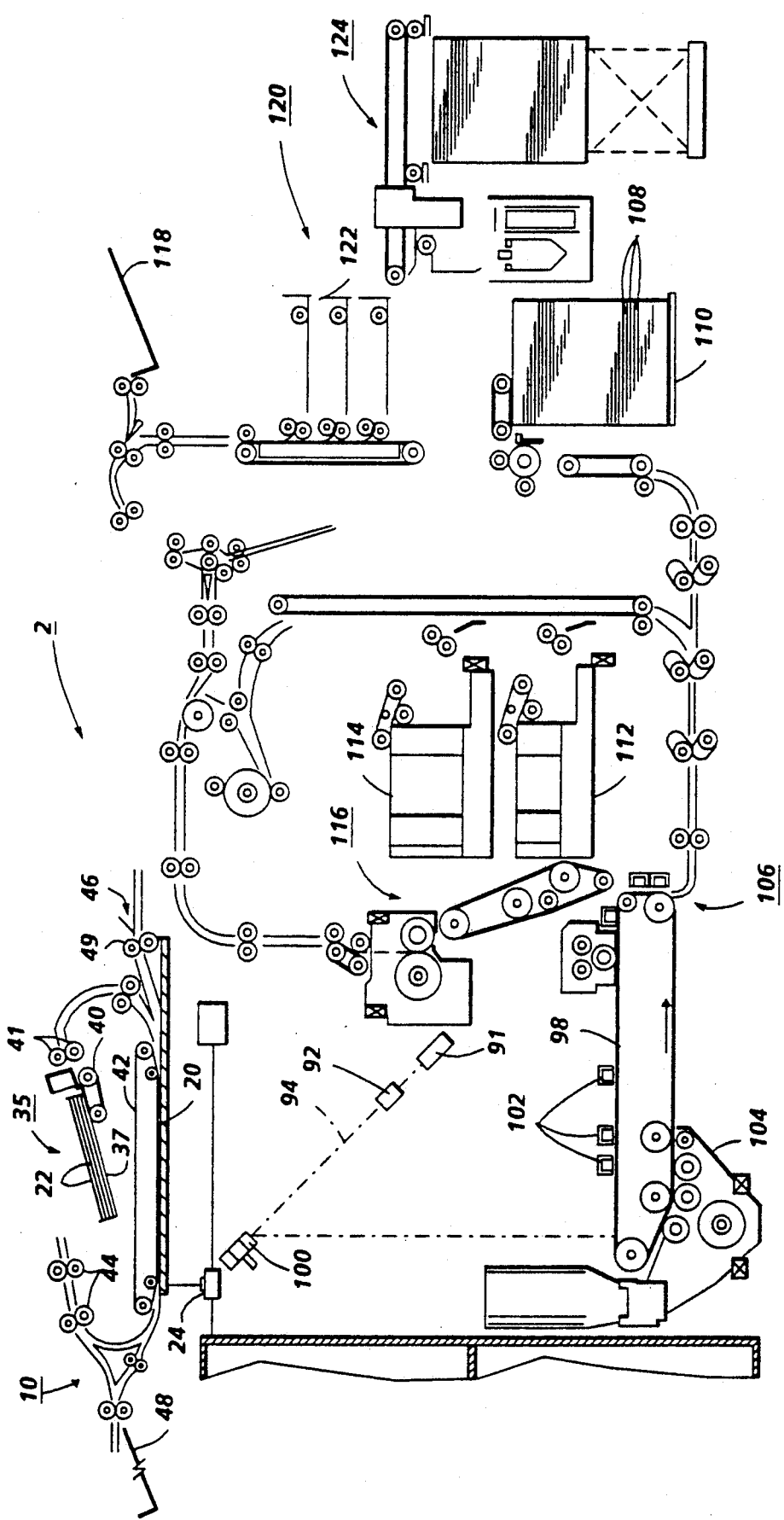
FIG. 3 is a plan view illustrating the principal mechanical components of the system shown in FIG. 1.
Figure 4:
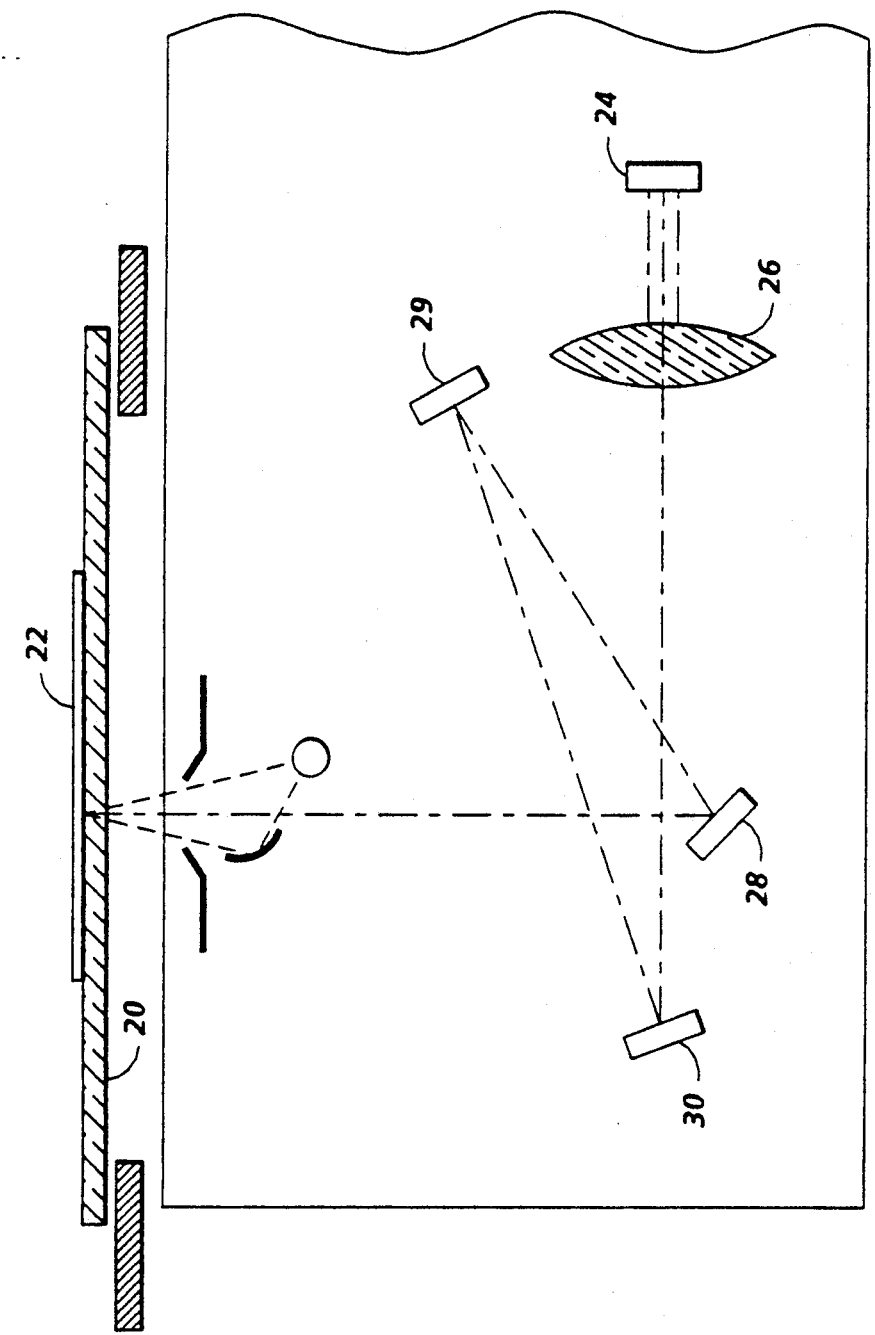
FIG. 4 is a schematic view showing certain construction details of the document scanner of the system shown in FIG. 1.

Referring particularly to FIGS. 2-4, network 5 comprises any suitable communication channel such as a telephone line for enabling data from one or more remote sources to be input to system 2 for processing.

Scanner 6 incorporates a transparent platen 20 on which the document 22 to be scanned is located. One or more linear arrays 24 are supported for reciprocating scanning movement below platen 20. Lens 27 and mirrors 28, 29, 30 cooperate to focus array 24 on a line like segment of platen 20 and the document being scanned thereon. Array 24 provides image signals or pixels representative of the image scanned which after suitable processing by processor 25, are output to controller 7.

Processor 25 converts the analog image signals output by array 24 to digital and processes the image data from network 5 and scanner 6 as required to enable system 2 to store and handle the image data in the form required to carry out the job programmed. For image data input by scanner 6, processor 25 also provides enhancements and changes to the image signals such as filtering, thresholding, screening, cropping, reduction/enlarging, etc. Following any changes and adjustments in the job program, the document must be re-scanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller 7 is, for explanation purposes, divided into an image input controller 50, User Interface (UI) 52, system controller 54, main memory 56, image manipulation section 58, and image output controller 60.

Image data input to controller 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different Requests, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program Requests and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer 8. Image data sent to printer 8 for printing is normally purged from memory 56 to make room for new image data.

Referring particularly to FIGS. 5A-5C, control 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer 8; dispatch processor PWB 70-9 having dispatch processors 88, 89 for controlling transmission of data to and from printer 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

Referring to FIGS. 8-10, image manipulation processor 58 includes a System State Controller (SSC) 160 which serves as a function executor for controlling and prioritizing operation of the various Virtual Machines in response to Job Processing Requests. SSC 160 receives Job Processing Requests from function queue 165 and converts the Request into a series of discrete Virtual Machines 156 with the Service Pieces 158 needed to carry out the job programmed.

SSC 160 includes a state holder 162 which maintains a running log of the state of the various Virtual Machines and Service Pieces that comprise system 2. The operating state and fault/condition of the Service Pieces and their components are monitored by a suitable state detector 161 and fault/condition detector 163 which continuously feed back updated service and component condition data to SSC state holder 162. SSC 160 also includes Long Term Scheduler (LTS) 164 which sets priorities for the Virtual Machines required when processing jobs.

In the example shown in FIG. 9, Virtual Machine, Service Piece and Job Processing Request mappings are as follows:

Capture Inter-Press (IP) 168 comprised of pre-parser service 170 and Image Conversion Service (ICS) 182-enables input of PDL data to system 2 from network 5;

Scan-To-Disk 174 comprised of scan service 176-enables input of image data from scanner 6;

Page Edit 178 comprised of post parse service 180 and (ICS) 182-enables a local operator to view and alter portions of a job;

Coalesce 184 comprised of ICS service 182, post parse service 180 and other services such as rotate 185 enables the preparation of a job for printing;

Background 186 enables housekeeping functions that go on anytime system 2 is up and running;

Disk-To-Print 188 comprised of post parse service 180 and mark service 192 enables the transfer of electronic input data on disk to images on paper provided by printer 8.

Other Virtual Machines and service combinations may be envisioned.

Referring particularly to FIG. 10, operator instructions or commands input via UI 52 are accepted by dialog 194. The dialog is thereafter converted by Trillium Emulator (TEM) 196 into the internal language (i.e. Mesa) used by system 2. Commands and PDL data received via network 5 are converted by pre-parser service 170 to the internal format used by system 2. It is understood that image data input via scanner 6 does not require pre-parsing. Other data includes background data that is generated whenever system 2 is running, since certain background operations take place to maintain the system in an operating condition.

A command processor 200 converts the commands into a set of job processor and SSC commands which are forwarded to job processor 202 and to SSC 160. Command processor 200 also enables recovery of faulted objects (i.e., jobs) and provides a faulted job count ("faults") by queue for display by status handler 208.

Job processor 202 maintains a database of jobs in system 2 and function queues. Processor 202 also manages the data manipulation required for running jobs in the system and provides job state information ("Job state") to command processor 200. Processor 202 provides SSC 160 with tasks (steps) that have passed all job requirements for a particular service, and passes an identifier (i.e., Res Manager ID) for tasks that are ready to be processed to SSC. Processor 202 also informs SSC when a high priority task for service is available thus managing task priorities. Processor 202 receives job processing results ("Job Results") from schedulers 210 and uses this data to build and checkpoint jobs. Processor 202 also receives service rates and data ("Service Rates & Data") from schedulers 210 to determine when a task should be made available, and job queue information ("Job Queue") for input ("Queue data") to SSC 160 so that the SSC can make intelligent resource tradeoffs.

Schedulers 210 ("Step Executors") include mark scheduler 212, scan scheduler 214, ICS scheduler 216, post-parse scheduler 218, and pre-parse scheduler 219 for scheduling tasks carried out by mark, scan, ICS, post parse, and pre-parse services 192, 176, 182, 180, 170 respectively in accordance with commands from SSC 160. Schedulers 210 perform processing of a task for the Service associated with the task, checking parameters, updating task state, and adding pages to a job. Schedulers 210 track their own faults, and provide means for SSC 160 to control component usage (i.e., stop, abort, resume, power off, intialize, etc). Schedulers 210 also provide page, set, and job done data to SSC 160, implement interrupts at the page and set boundaries, and implement resume.

SSC 160 is an example of a "Function Executor". SSC 160 understands what needs to be be done to or with portions of system 2 to accomplish a Request. SSC 160 accepts service commands ("Service Commands") with task identifier (i.e., Res Manager ID) from job processor 202 and decides, based on current system operating data (i.e., fault, resource, state) if a service for a Virtual Machine is ready to accept a command. SSC 160 calls schedulers 210 to change state ("change State") by executing commands. SSC 160 also implements interrupts at the job level and resumes, and accepts higher priority tasks from job processor 202. SSC 160 receives data about state changes from different parts of the system to maintain a current view of the system state. SSC 160 also coordinates the interactions between multiple services, and provides service states, faults, and current job information to status handler 208 for display on touchscreen 62 of UI 52.

SSC 160 enables and tracks clearance and recovery from faults. The clearance can be an acknowledgement from the local operator via a selection on touchscreen 62 of UI 52 and passed through TEM 196 or a sensing from within the system that all actions have been taken to clear the fault. SSC 160 also handles system resource problems by changing resource component priorities using allocator 220. For this, LTS 164 of SSC 160 uses data from schedulers 210 ("Page, Set, Job Done".) and queue data (i.e., run lengths, etc.) from job processor 202 to make intelligent resource tradeoffs, using commands to appropriate service schedulers 210 to suspend or shutdown when their resource components are needed elsewhere.

When a job enters system 2, Command Processor 200 updates job Processor 202 with all the required job data. The job processor 202 informs SSC 160 when the job requires a particular service and waits for the appropriate scheduler 210 to retrieve the job for its service. If the service completes its task with no faults, the scheduler 210 updates the job processor 202 and then advances the job to the next service. If, however, the service has a fault while performing its task, the scheduler 210 will inform SSC 160 which will provide the state, fault, and current job information to status handler 208 for display on touchscreen 62 of UI 52. If the fault is clearable, the service will resume its task upon clearance and recovery of the fault.

During a job, when a service working on behalf of a Virtual Machine requires more memory than is currently assigned to it by LTS 164, the service messages LTS 164. LTS 164 endeavors to find the additional memory with the least impact on system operation as for example by shifting available memory within a Virtual Machine from services not currently required and allocating the memory to the service making the request. Where the amount of memory obtained is insufficient within the Virtual Machine, LTS 164 shutdowns other Virtual Machines in accordance with a determined priority until the needed memory is obtained. In the example shown, Disk-To-Print Virtual Machine 188 has the highest priority, Page Edit 178 second priority, etc. Other or different priorities may, however, be envisioned.

Background Virtual Machine 186 which go on all the time are normally excluded from the pool of Virtual Machines from which LTS 164 can obtain memory.

SSC 160 also accepts Requests from the user or from within the system 2 that are not related to initiating Job Processing. These Requests either modify the system's 2 operation or modify a job's processing that was previously initiated. In the former case, for example, the operator can request to power off system 2. If system 2 is processing jobs, SSC 160 will either abort all services running jobs or allow the services to complete the current jobs but prevent new jobs from starting. This decision is made by the operator. Once system 2 is quiesced, SSC 160 will initiate the power off. In the latter case, for example, the operator can request printer 8 to suspend and wait for further commands. SSC 160 will log the source of the request and command the service to suspend. When the operator provides its next request (i.e. abort or resume), SSC 160 will check the states for that service and Virtual Machine and will initiate the request if the states permit it.

With multiple sources for state changing Requests, SSC 160 could receive conflicting Requests. To prevent system 2 from processing Requests in an illogical order, SSC 160 logs the origin of each Request and understands what is needed before resuming each service. For example, the mark service 192 can run out of data to print and inform SSC 160 of the problem. SSC 160 notes the problem and waits for Job Processor 202 to inform SSC 160 that enough data has accumulated for the mark service 192 to resume. At the same time mark service 192 suspends itself, the operator can request printer 8 to stop. SSC 160 will also log the Request from the operator. SSC 160 will not resume mark service 192 until both Job Processor 202 and the operator have provided their approval for resumption.

Where LTS 164 senses that the performance of system 2 is degraded (i.e., at reduced speed) due to concurrency, the SSC may respond by temporarily shutting down some Virtual Machines in favor of others to allow an expedient completion of certain Requests.

While the invention has been described with reference to the structure disclosed, it is not confined to the details set forth, but is intended to cover such modifications or changes as may come within the scope of the following claims.

We claim:

1. A state controller for an electronic reprographic system for controlling system operations when processing requests in which said system has a plurality of hardware and software system components providing discrete services for processing requests and maintaining operation of said system, and job programming means including a display screen for inputting requests, comprising:
    a) a state holder for monitoring the current operating state of said system components;
    b) plural discrete job processing virtual machines with each of said virtual machines having at least one service associated with it for implementing the virtual machine;
    c) each of said services having at least one of said system components for carrying out the service; and
    d) scheduling means for managing resources of and setting priorities for said virtual machines to process said requests in an efficient manner, said scheduling means being adapted to cause memory from a first one of said virtual machines to be distributed to a second one of said virtual machines when said second one of said virtual machines requests more memory than is normally allocated to it.

2. The state controller according to claim 1 including job processing means adapted on programming a request to separate said request into a mix of virtual machine selections for input to said state controller.

3. The state controller according to claim 2 in which said job processing means provides a task identifier with each of said virtual machine selections.

4. The state controller according to claim 3 including command processing means for converting job commands input to said system into requests for input to said job processing means for use in providing said virtual machine selections.

5. The state controller according to claim 4 including second scheduling means for at least one of said services for maintaining a queue of current jobs using said service for input to said job processing means.

6. The state controller according to claim 5 in which said second scheduling means provides on-going job data to said job processor for use by said job processor in making said virtual machine selections.

7. The state controller according to claim 6 in which said job processing means provides job state information to said command processing means for display on said screen.

8. The state controller according to claim 7 in which said job state information includes fault data;
    said command processing means displaying said faults on said screen.

9. The state controller according to claim 8 in which said scheduling means provides change of state commands to said second scheduling means in response to said service commands and said job queue information.

* * * * *